United States Patent [19]
Glady et al.

[11] Patent Number: 5,517,260
[45] Date of Patent: May 14, 1996

[54] OPHTHALMIC LENS HAVING A PROGRESSIVE MULTIFOCAL ZONE AND METHOD OF MANUFACTURING SAME

[75] Inventors: George E. Glady, Gaithersburg, Md.; George K. Meszaros, Washington, D.C.

[73] Assignee: Vari-Site, Inc., Wilmington, Del.

[21] Appl. No.: 217,802

[22] Filed: Mar. 28, 1994

[51] Int. Cl.⁶ .................................................. G02C 7/06
[52] U.S. Cl. ........................... 351/169; 351/161; 351/168
[58] Field of Search ........................... 351/160 R, 161, 351/168, 177, 169

[56] References Cited

U.S. PATENT DOCUMENTS

| | | | |
|---|---|---|---|
| 3,270,099 | 8/1966 | Camp . | |
| 3,485,556 | 12/1969 | Naujokas | 351/169 |
| 3,614,218 | 10/1971 | Bronstein | 351/161 |
| 4,580,882 | 4/1986 | Nuchman et al. | 351/161 |
| 4,618,227 | 10/1986 | Bayshore | 351/161 |
| 4,637,697 | 1/1987 | Freeman | 351/161 |
| 4,640,595 | 2/1987 | Volk | 351/160 R |
| 4,702,573 | 10/1987 | Morstad | 351/161 |
| 4,704,016 | 11/1987 | de Carle | 351/161 |
| 4,710,193 | 12/1987 | Volk | 351/161 |
| 4,784,482 | 11/1988 | Guilino | 351/169 |
| 4,861,152 | 8/1989 | Vinzia et al. | 351/161 |
| 4,890,912 | 1/1990 | Visser | 351/161 |
| 4,890,913 | 1/1990 | de Carle | 351/161 |
| 4,909,621 | 3/1990 | Evans | 351/161 |
| 4,936,672 | 6/1990 | Capez | 351/161 |
| 4,950,057 | 8/1990 | Shirayanagi | 351/169 |
| 5,042,936 | 8/1991 | Guilino | 351/169 |
| 5,076,684 | 12/1991 | Simpson et al. | 351/168 |
| 5,080,472 | 1/1992 | Gupta | 351/161 |
| 5,112,351 | 5/1992 | Christie | 351/169 X |
| 5,121,980 | 6/1992 | Cohen | 351/161 |
| 5,125,729 | 6/1992 | Mercure | 351/161 |
| 5,172,143 | 12/1992 | Baude et al. | 351/177 |
| 5,181,053 | 1/1993 | Brown | 351/161 |
| 5,198,844 | 3/1993 | Roffman et al. | 351/161 |
| 5,214,453 | 5/1993 | Giovanzana | 351/161 |

Primary Examiner—David C. Nelms
Assistant Examiner—Son Mai
Attorney, Agent, or Firm—Finnegan, Henderson, Farabow, Garrett & Dunner

[57] ABSTRACT

An ophthalmic lens including a first zone located in a central portion of the ophthalmic lens such that a central axis intersects the center of the first zone. The first zone having a spherical posterior surface for correcting distance vision. The ophthalmic lens further includes a second zone, positioned about the periphery of the first zone, and having a posterior surface of revolution defined by rotating a portion of a spiral curve about a central axis of the ophthalmic lens. Additionally, the ophthalmic lens may include a third zone positioned about the periphery of the second zone, and having a spherical posterior surface for correcting near vision.

30 Claims, 2 Drawing Sheets

OPHTHALMIC LENS HAVING A PROGRESSIVE MULTIFOCAL ZONE AND METHOD OF MANUFACTURING SAME

BACKGROUND OF THE INVENTION

1. Field of the Invention

The present invention relates to an ophthalmic lens having a progressive multifocal zone and a method of manufacturing the ophthalmic lens. More particularly, the present invention relates to a contact lens having an aspheric progressive multifocal zone produced by rotating a portion of a spiral curve about an axis.

2. Discussion of the Related Art

Many individuals suffer from a condition known as presbyopia, which requires visual correction for near, distant, and intermediate distances. Such individuals are referred to as "presbyopes." Currently, presbyopes most commonly use bifocal lenses to partially remedy their condition. Although bifocals provide visual correction for near and distant vision, bifocals do not, however, provide visual correction for intermediate distances. To this end, trifocals were developed to provide visual correction for a single intermediate distance. However, trifocals do not completely remedy presbyopia because they do not provide visual correction for all possible intermediate distances.

In an effort to overcome the deficiencies of bifocals and trifocals and to provide a complete remedy for presbyopia, lens designers have developed lenses that include an aspheric progressive multifocal zone between near and distant correcting zones in order to provide continuous visual correction for all intermediate distances. Such multifocal lenses have failed to gain wide acceptance from presbyopes for various reasons stemming from the particular designs of the multifocal lenses.

Multifocal lenses utilize one of two basic approaches to provide correction for all distances. The first approach is known as alternate vision correction in which the presbyope looks through separate correcting zones of the lens to correct for the specific distance at which a viewed object is situated. Although designers typically utilize this approach for spectacle lenses, designers may also utilize this approach for contact lenses. To develop an alternate vision correction contact lens, designers typically utilize prisms or ballasts to maintain orientation of the contact on the eye. The wearer may move the contact lens relative to the position of their pupil by means of a protruding ledge, in order to look through the region of the contact lens providing the appropriate correction for the current viewing distance.

Although bifocal lenses designed with the alternate viewing approach have been reasonably successful, multifocal lenses having more than two correcting zones and designed with this approach have not gained wide acceptance due to their reliance upon the wearer to properly reposition the lens or to tilt their head each time the viewing distance changes. Such manual manipulation of the lens is extremely problematic while driving a vehicle. Moreover, proper manual positioning of a multifocal contact lens having a progressive zone is next to impossible.

The second approach in designing multifocal lenses is known as simultaneous vision correction in which correction of vision is available for all distances without requiring repositioning of the lens relative to the pupil or tilting of one's head to look through the appropriate correction zone. Simultaneous vision correction relies upon the ability of the individual's brain to selectively choose a sharp image when sharp and blurry images are simultaneously projected on their retinas. Lens designers have exerted much effort into the design of the aspheric progressive multifocal zone, which is responsible for intermediate distance viewing correction, in order to simultaneously project images on a wearer's retinas such that a sharp image for the appropriate viewing distance can be readily selected by the wearer's brain. However, despite these efforts, lens designers have achieved only limited success in designing a multifocal lens that performs this function.

Due in part to a misunderstanding of the shape of a human eye and, in part, to previous manufacturing limitations, conventional contact lenses typically include an aspheric progressive multifocal zone that is formed by rotating a conic section about a central axis. As used herein, the term "conic section" refers to a curve that results from intersecting a cone with a plane at any angle. A conic section may be mathematically defined in terms of "eccentricity." The eccentricity e of a conic section equals the distance between a point on the conic section curve P and a focus F divided by the distance between a point on the conic section curve P and a directrix L ($e = g(P,F)/d(P,L)$).

Conic sections may be characterized by their eccentricity. A conic section having an eccentricity equal to zero ($e=0$) is a circle. A conic section having an eccentricity less than one ($e<1$) is an ellipse. A conic section having an eccentricity equal to one ($e=1$) is a parabola. And, a conic section having an eccentricity greater than one ($e>1$) is a hyperbola.

Lens designers have been forming aspheric progressive multifocal zones by rotating conic sections because it has been commonly believed that the human eye may be described in terms of conic sections. Contact lenses having an aspheric progressive multifocal zone by rotating conic sections have been described in U.S. Pat. No. 4,640,595 issued to David Volk and U.S. Pat. No. 5,214,453 issued to Mario Giovanzana. In these patents, the conic sections are described as having continuously varying eccentricities. This approach illustrates the difficulties in attempting to mathematically describe the human cornea. If the eye could be described in terms of conic sections, the visual shape of the eye is hyperbolic, but readings from photo-electric keratoscopes (PEK) indicate that the shape could be described as elliptical. This contradiction implies that the cornea is either described by a much more complicated mathematical formula or is a more random shape which could only be described with Chaos mathematics. The latter implication being the most probable.

Studies have shown that the shape of the cornea changes with diameter even when central keratometer "K" readings are the same. Thus, fitting a conic section off the central K readings of an individual's corneas, is not a sound approach to contact lens design.

Prior to the conception of the numerically controlled lathe, aspheric surfaces were formed using cams. Because these cams have been expensive to produce, lens designers took the approach of designing aspheric lens surfaces which can be produced using a single cam resulting in aspheric lens surfaces having the same shape factor regardless of the individual needs of a patient. Lens designers did not take different approaches because of the expense involved in making a cam for each shape factor that may be required by a patient. Despite the present availability numerically controlled lathes, lens designers have not varied their approach, and continue to design lenses which do not meet the needs of the individual patients.

The "Add" of a multifocal lens is the difference in dioptric power between the near and distant correction zones. As discussed above, designers of conic section aspheric lenses have typically used only one shape factor and/or numerical eccentricity and have tried to maximize the Add before they loose the fitting characteristics. This approach tends to limit the obtainable Add to less than 2.0 diopters. In other words, such a lens is "Add-limited." However, a large number of presbyopes exist who require Adds that cannot be obtained with this approach.

Another reason designers of conic section aspheric lenses typically use only one numerical eccentricity or one range of eccentricities for all contact lenses is that designers previously believed that the eccentricity of the aspheric surface defining the progressive zone need not vary for different Adds. Thus, lens designers were not previously aware that there was any reason to vary the eccentricity for individuals requiring different Adds.

SUMMARY OF THE INVENTION

Accordingly, the present invention has been made in view of the above circumstances and has as an object to provide an ophthalmic lens having an aspheric progressive multifocal surface, which projects sharp images onto a wearer's retinas for all viewing distances that the wearer's brain may readily discriminate from simultaneously projected blurry images.

A further object of the present invention is to provide an ophthalmic lens which is designed to properly fit on a wearer's cornea and which is not Add-limited.

Another object of the present invention is to provide an ophthalmic lens which has a simple and customizable design intended to meet the correction and fitting requirements of each individual.

Additional objects and advantages of the invention will be set forth in part in the description which follows and in part will be apparent from the description, or may be learned by practice of the invention. The objects and advantages of the invention may be realized and attained by means of the instrumentalities and combinations particularly pointed out in the written description and claims hereof as well as the appended drawings.

To achieve these and other objects and advantages and in accordance with the purpose of the invention, as embodied and broadly described herein, the ophthalmic lens of this invention comprises a progressive zone having a surface of revolution defined by rotating a portion of a spiral curve about a central axis of the ophthalmic lens.

Additionally, to achieve these and other objects and advantages and in accordance with the purpose of the invention, as embodied and broadly described herein, the ophthalmic lens of this invention comprises a progressive zone having an aspheric surface of a predetermined asphericity which is determined based upon correction and fitting requirements of an individual for whom the ophthalmic lens is specifically designed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate one embodiment of the invention and, together with the description, serve to explain the objects, advantages, and principles of the invention. In the drawings.

DETAILED DESCRIPTION OF THE PREFERRED EMBODIMENTS

Reference will now be made in detail to the present preferred embodiment of the invention, an example of which is illustrated in the accompanying drawings.

Figure 1:
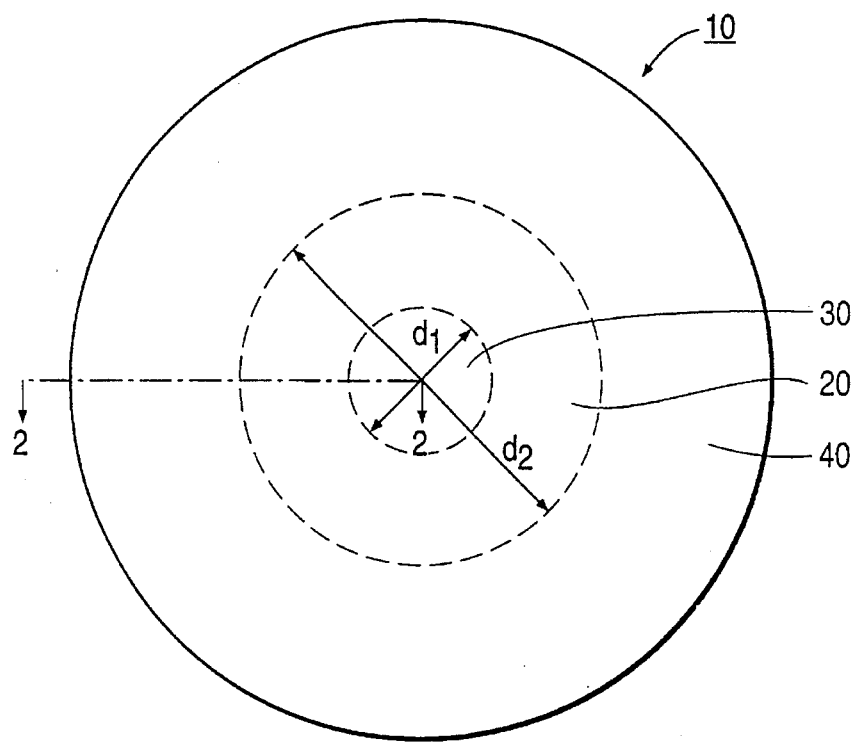
FIG. 1 is a schematic view of the front surface of a multifocal ophthalmic lens representing the preferred embodiment of the present invention.

The exemplary embodiment of the multifocal ophthalmic lens of the present invention is shown in FIG. 1. As illustrated in FIG. 1, the ophthalmic lens of the present invention is preferably embodied in a contact lens 10. Although the principles of the present invention will hereinafter be described with respect to contact lenses, it will be apparent to those of ordinary skill in the art that the principles of the present invention may be embodied in other ophthalmic lenses such as eyeglass lenses and intraocular lenses.

In the preferred embodiment, contact lens 10 includes at least a progressive zone 20 that provides vision correction for a plurality of distances ranging from the individual's required near vision correction to the individual's distant vision correction. Additionally, contact lens 10 may include a first zone 30 located in a central portion of contact lens 10 such that progressive zone 20 is positioned about the periphery of first zone 30. Contact lens 10 may further include a second zone 40 positioned about the periphery of progressive zone 20.

Preferably, first zone 30 is provided to correct the individual wearer's distance vision, and second zone 40 is provided to correct near vision. However, the roles of the first and second zones may be reversed such that first zone 30 is provided to correct near vision, and second zone 40 is provided to correct distance vision.

Those of ordinary skill in the art will appreciate that the first and second zones are not required provided that the progressive zone covers a range of distances that includes the individual wearer's near and distance vision corrective requirements. It is preferable to include first and second zones, however, to allow more light to pass through these frequently used zones.

The details of the above described invention are hereinafter described with reference to FIGS. 2 and 3 which show a partial cross section of the contact lens shown in FIG. 1 taken along line 2—2.

Figure 2:
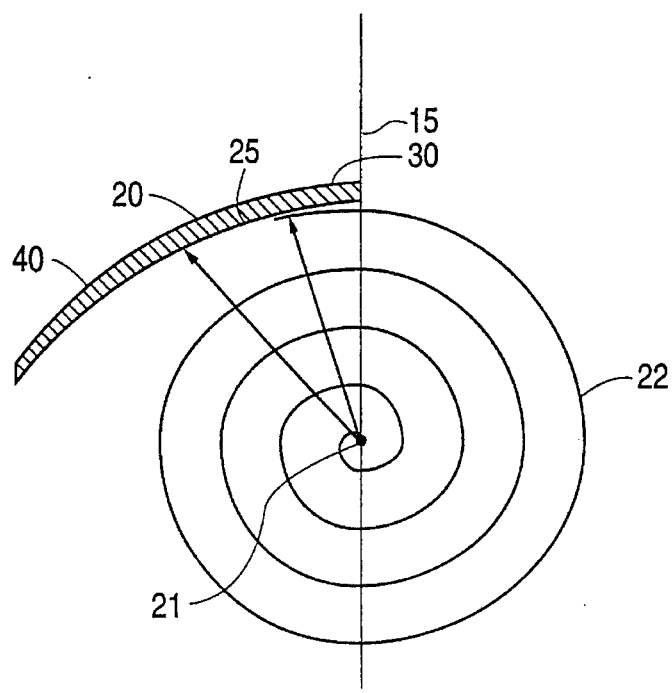
FIG. 2 is a partial cross sectional view of the multifocal ophthalmic lens shown in FIG. 1 taken along line 2—2.
Figure 3:
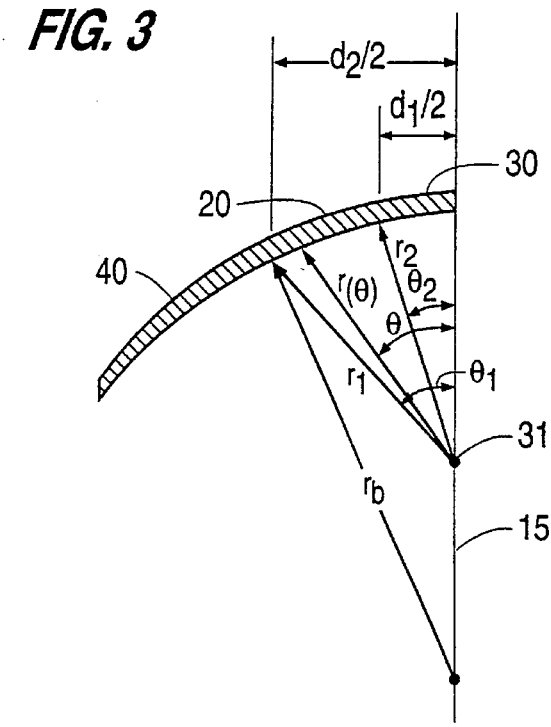
FIG. 3 is a partial cross sectional view of the multifocal ophthalmic lens shown in FIG. 1 taken along line 2—2.

As shown in FIG. 2, progressive zone 20 has a surface of revolution defined by rotating a portion 25 of a spiral curve 22 about a central axis 15 of contact lens 10. Preferably, this surface of revolution is the posterior surface of contact lens 10 and the starting point 21 of spiral curve 22 lies on the central axis 15 of contact lens 10.

As embodied herein, the term "spiral" represents any curve lying in a plane where the radius r may be expressed as a function of $\theta$ ($r=f(\theta)$), when expressed in polar coordinates, by which r continuously increases or decreases as θ increases.

By defining a progressive multifocal surface of an ophthalmic lens as a portion of a spiral curve rotated about a central axis of the ophthalmic lens, sharp images, which the individual's brain may readily discriminate from simultaneously projected blurry images, may be projected onto an individual's retinas for all viewing distances.

To more fully understand how a progressive surface may be formed by rotating a portion 25 of spiral curve 22 about central axis 15 of contact lens 10, the method of making contact lens 10 will now be described with respect to FIG. 3.

First, a lens blank is formed to have the individual's required base curvature and to satisfy the individual's near vision prescription. This initial step is performed using conventional methods for forming a contact lens for near vision correction. In general, using the most recent K readings and spectacle refraction, the base curvature is selected using a chart such as Table 1 provided below.

TABLE 1

| Corneal | Diameter | | |
| --- | --- | --- | --- |
| Cylinder | 8.8 mm | 9.2 mm | 9.6 mm |
| 0.00–0.50 D | on flat "K" | 0.25 D flatter | 0.50 D flatter |
| 0.75–1.25 D | 0.25 D steeper | on flat "K" | 0.25 D flatter |
| 1.50–2.00 D | 0.50 D steeper | 0.25 D steeper | on flat "K" |
| 2.25–2.75 D | 0.75 D steeper | 0.50 D steeper | 0.25 D steeper |
| 3.00–3.50 D | 1.00 D steeper | 0.75 D steeper | 0.50 D steeper |

Thus, the resulting intermediate lens will have a posterior surface of radius $r_b$, which represents the required curvature for second zone 40.

Next, first zone 30 is formed in a central portion of the intermediate lens having a surface of radius $r_2$ to satisfy the individual's distance vision prescription. The radius of curvature $r_2$ of the posterior surface of the central first zone 30 is a posterior apical radius (PAR), which is calculated using the SAM-FAP Rule (steeper add minus-flatter add plus). The first zone 30 preferably has the same anterior radius as the second zone 40. Because there are an infinite number of PAR that will satisfy the distance vision requirements using a common anterior radius for the near vision, a typical starting point is to utilize a PAR that is at least two times the add power steeper than the near vision base curve.

Then, the annular-shaped progressive zone 20 is formed adjacent to first zone 30.

The particular spiral curve 22 used to define progressive zone 20 will vary from individual to individual due to the method by which the particular spiral curve 22 is selected. Ideally, the spiral curve 22 that is selected will provide a smooth transition from first zone 30 to second zone 40. Provided that the starting point 21 of spiral curve 22 lies on the central axis 15 of contact lens 10, the relationship between r and θ defining the spiral curve may be selected in a relatively simple manner, particularly when the starting point 21 of spiral curve 22 coincides with the origin 31 of the spherical surface defining first zone 30 and the relationship between r and θ is linear. In this case, the radial value r of spiral curve 22 for the angle $\theta_2$ at which spiral curve 22 intersects the spherical surface defining first zone 30 will be equal to the radius of curvature $r_2$ of that spherical surface. The radial value r of spiral curve 22 for the angle $\theta_1$ at which spiral curve 22 intersects the spherical surface defining second zone 40 is shown in FIG. 3 as $r_1$. Radius $r_1$ is selected such that the sagittal depth is maintained at this point of intersection.

Once two values of r are defined for two values of θ, a linear relationship between r and θ defining the spiral can be readily determined.

The angles θ at which spiral curve 22 intersects the first and second zones, may be easily determined given the desired cord diameters of the respective zones. The inner and outer cord diameters $d_1$ and $d_2$ of the spiral curve are matched to the requirements of the individual patient. Typically, the inner cord diameter $d_1$ is not less than 1.0 mm and the outer cord diameter $d_2$ does not exceed the diameter of the pupil measured in dim illumination.

The relationship between r and θ need not be linear. It is preferable, however, that the relationship between r and θ remains the same within a specified zone.

Figure 4A:
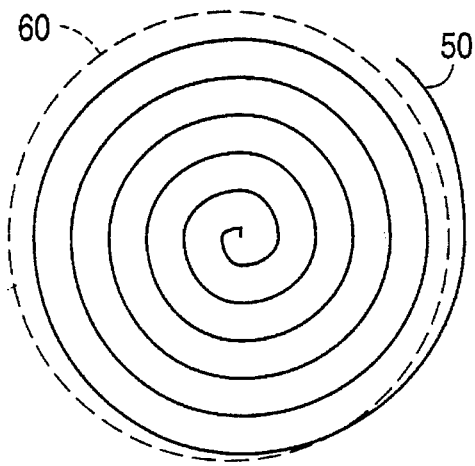
FIG. 4A is an illustration of a tightly wound spiral curve.
Figure 4B:
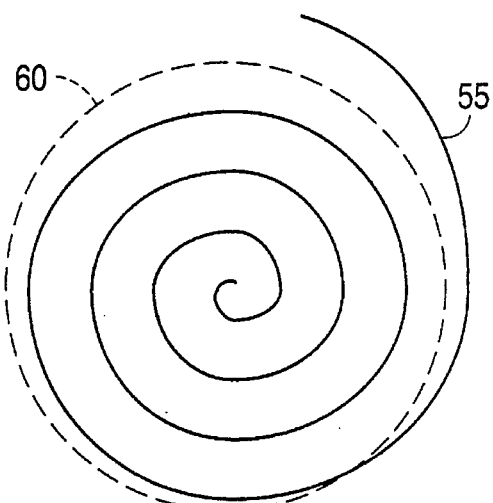
FIG. 4B is an illustration of a loosely wound spiral curve.

As pointed out above, the particular spiral curve 22 used to define progressive zone 20 will vary from individual to individual. Thus, one individual may require a tight spiral 50 such as that illustrated in FIG. 4A, while another individual may require a looser spiral 55 such as that illustrated in FIG. 4B. The tightness of the spiral is dependent upon the near and distance vision correction and fitting requirements of the individual wearer. Thus, the tightness of the spiral is also dependent upon the Add. The relative tightness of the required spiral may be expressed in terms of the asphericity of the spiral.

As embodied herein, the term "asphericity" describes the degree to which a surface of revolution diverges from the shape of a sphere. Hence, the lesser the asphericity, the more the surface of revolution approximates the surface of a sphere, and the greater the asphericity, the less the surface of revolution approximates the surface of a sphere.

The asphericity of the surface of revolution of a spiral is the proximity of the derivative of the function of r(θ) to zero. TO produce a spherical surface of revolution, the planar curve defining the surface must be circular with its center located on the axis about which the curve is rotated. Such a circular curve expressed in polar coordinates must be represented by r=a, where a is a constant. Thus, the derivative dr/dθ of such a circular curve must equal zero. A tightly wound spiral 50 will more closely approximate a circular curve 60 than a loosely wound spiral 55 since r changes less with each change in θ. Thus, the closer the derivative dr/dθ is to zero the closer the spiral approximates a circle and the closer the resulting surface of r(θ) revolution would approximate a sphere.

The proximity of the derivative of the function of (dr(θ)/dθ) to zero also is appropriate to define, in relative terms, the asphericity of any surface of revolution resulting from rotating a planar curve expressed in polar coordinates about an axis. This definition applies to conic sections as well. The asphericity of the surface of revolution of a conic section (i.e., a conicoid) may also be defined as the proximity of the eccentricity of the curve to zero.

By providing a progressive zone having an aspheric surface of a predetermined asphericity which is determined based upon correction and fitting requirements of an individual for whom the ophthalmic lens is specifically designed, the ophthalmic lens is not Add-limited and the exact correction may be calculated and provided for the individual patient.

The aspheric surface of progressive zone 20 need not be defined by rotating a spiral curve about a central axis of the lens. Alternatively, the spiral curve 22 may be approximated using a series of conic section curves in order to obtain the benefits that result when a spiral curve is used. To approximate the spiral curve, one may calculate the sagittal depth of the lens at a number of points in the progressive zone. Then, a series of curves may be selected that best fit the curve to provide the same sagittal depths in approximately the same locations. The selected curves should not provide a sagittal depth variation greater than 0.001 mm from the spiral curve within the progressive zone 20.

The difference between a progressive zone defined by such a series of conic section curves and the progressive zones previously known in the art, is that the eccentricity (asphericity) varies from individual to individual. Thus, contrary to approaches previously taken, the eccentricity of a progressive zone surface constructed in accordance with the principles of the present invention is dependent upon the Add required for the individual wearer.

To illustrate how the ophthalmic lens of the present invention satisfies the exact correction necessary for the individual patient, the following Table 2 illustrates how the eccentricity of a conic section would vary with respect to an individual's required base curvature and Add when the progressive zone is defined by a conic section curve intended to approximate a spiral.

TABLE 2

|  | Add Powers | | |
| --- | --- | --- | --- |
| Apical Radius | +1.00 | +2.00 | +3.00 |
| 7.10 | 0.881 | 1.099 | 1.258 |
| 7.35 | 0.926 | 1.154 | 1.319 |
| 7.60 | 0.972 | 1.210 | 1.382 |
| 7.85 | 1.019 | 1.266 | 1.445 |
| 8.10 | 1.066 | 1.323 | 1.508 |
| 8.35 | 1.114 | 1.381 | 1.572 |
| 8.60 | 1.162 | 1.439 | 1.637 |

Table 2 covers a base curve range of three standard deviations for a normally distributed population. The value of the standard deviation is taken from Guillon, Lydon, and Wilson, "Corneal Topography: A Clinical Model" *Opthal Physiol Opt* 1986, Vol. 6, pp. 47–56. The equivalent "e" value is the conic section that would have the same sagittal depth and PAR at the outermost chord diameter of the spiral curve.

The ophthalmic lens of the present invention is preferably made by lathe cutting the appropriate shape in the lens with a computerized numerically controlled (CNC) lathe. A CNC lathe is of sufficient quality that a semi-finished surface may be optically verified without further surface finishing. It is preferable that the CNC lathe have two axes that are numerically controlled with command positioning better than 0.001 mm for a linear axis or 0.1 degrees for a rotary axis Additionally, by using a properly programmed CNC lathe, a lens may be constructed in accordance with the present invention by merely providing the individual's base curvature, near and distance prescriptions, and tile cord diameters of the respective zones.

The ophthalmic lens of the present invention may also be made by grinding, casting, or molding.

To improve the cosmetic appearance of the surface of the lens, the lens can be polished with, or tumbled in, any suitable polishing compound and/or medium.

The materials used to make the ophthalmic lens of the present invention are virtually unlimited. The ophthalmic lens of the present invention may tie made of any materials currently used to make hard or soft contact lenses, intraocular lenses, or spectacle lenses. Because many individuals who may require multifocal lenses view computer screens for extended periods of time, ultraviolet blocking additives may be added to the material of which the present invention is made.

The ophthalmic lens of tile present invention may further be modified, using traditional methods, to correct for astigmatism.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An ophthalmic lens comprising:
   a progressive zone having a surface of revolution defined by rotating a portion of a spiral curve about a central axis of the ophthalmic lens.

2. The ophthalmic lens of claim 1, further comprising:
   a first zone located in a central portion of the ophthalmic lens such that the central axis intersects the center of the first zone and the progress zone is positioned about the periphery of the first zone.

3. The ophthalmic lens of claim 2, wherein the first zone has a spherical surface.

4. The ophthalmic lens of claim 2, wherein the first zone corrects for distance vision.

5. The ophthalmic lens of claim 2, wherein the first zone corrects for near vision.

6. The ophthalmic lens of claim 2, further comprising:
   a second zone positioned about the periphery of the progressive zone.

7. The ophthalmic lens of claim 6, wherein the second zone has a spherical surface.

8. The ophthalmic lens of claim 6, wherein the first zone corrects for distance vision, and the second zone corrects for near vision.

9. The ophthalmic lens of claim 6, wherein the first zone corrects for near vision, and the second zone corrects for distance vision.

10. The ophthalmic lens of claim 1, wherein the surface of revolution defined by rotating the portion of the spiral curve about the central axis of the ophthalmic lens is located on the posterior surface of the ophthalmic lens.

11. The ophthalmic lens of claim 1, wherein the surface of revolution of the progressive zone has a predetermined asphericity which is determined based upon correction and fitting requirements of an individual for whom the ophthalmic lens is specifically designed.

12. The ophthalmic lens of claim 1, wherein the starting point of the spiral curve lies on the central axis of the ophthalmic lens.

13. An ophthalmic lens comprising:
   a progressive zone having an aspheric surface of a predetermined asphericity which is determined based upon correction and fitting requirements of an individual for whom the ophthalmic lens is specifically designed such that the lens is not Add-limited.

14. The ophthalmic lens of claim 13, further comprising:
   a first zone located in a central portion of the ophthalmic lens such that the central axis intersects the center of the first zone and the progress zone is positioned about the periphery of the first zone, the first zone having a spherical surface; and a second zone positioned about the periphery of the progressive zone, the second zone having a spherical surface.

15. The ophthalmic lens of claim 14, wherein the first zone corrects for distance vision, and the second zone corrects for near vision.

16. The ophthalmic lens of claim 14, wherein the first zone corrects for near vision, and the second zone corrects for distance vision.

17. The ophthalmic lens of claim 13, wherein the aspheric surface is located on the posterior surface of the ophthalmic lens.

18. The ophthalmic lens of claim 13, wherein the aspheric surface is defined by rotating a portion of a spiral curve about a central axis of the ophthalmic lens.

19. The ophthalmic lens of claim 13, wherein the aspheric surface is defined by rotating a series of conic sectional curves about a central axis of the ophthalmic lens.

20. The ophthalmic lens of claim 19, wherein the series of conic sectional curves approximate a spiral curve.

21. A contact lens comprising:

a first zone located in a central portion of the contact lens such that a central axis intersects the center of the first zone, the first zone having a spherical posterior surface for correcting distance vision;

a second zone, positioned about the periphery of the first zone, the second zone having a posterior surface of revolution defined by rotating a portion of a spiral curve about a central axis of the contact lens; and a third zone positioned about the periphery of the second zone, the third zone having a spherical posterior surface for correcting near vision.

22. The contact lens of claim 21, wherein the surface of revolution of the second zone has a predetermined asphericity which is determined based upon correction and fitting requirements of an individual for whom the contact lens is specifically designed.

23. An ophthalmic lens comprising:

a progressive zone having a surface of revolution defined by rotating a portion of a spiral curve about a central axis of the ophthalmic lens, said progressive zone correcting both for near vision and distance vision.

24. An ophthalmic lens comprising:

a progressive zone having an aspheric surface of a predetermined asphericity which is determined based upon correction and fitting requirements of an individual for whom the ophthalmic lens is specifically designed such that the lens is not Add-limited, the progressive zone correcting both for near vision and distance vision.

25. An ophthalmic lens, comprising:

a progressive zone having an aspheric surface of a predetermined asphericity which is determined based upon correction and fitting requirements of an individual for whom the ophthalmic lens is specifically designed, the aspheric surface defined by rotating a portion of a spiral curve about a central axis of the ophthalmic lens.

26. An ophthalmic lens, comprising:

a progressive zone having an aspheric surface of a predetermined asphericity which is determined based upon correction and fitting requirements of an individual for whom the ophthalmic lens is specifically designed, the aspheric surface defined by a spiral curve approximated by rotating a series of conic sectional curves about a central axis of the opthalmic lens.

27. An ophthalmic lens, comprising:

a progressive zone having an aspheric surface of a predetermined asphericity which is determined based upon correction and fitting requirements of an individual for whom the ophthalmic lens is specifically designed, the aspheric surface defined by a spiral curve approximated by calculating a saggital depth of the lens at a number of points in the progressive zone.

28. The ophthalmic lens of claims 1, 13, 25, 26, 27, 28 or 27, wherein the lens is a contact lens.

29. The ophthalmic lens of claims 1, 13, 25, 26, 27, 28 or 27, wherein the lens is a spectacle lens.

30. The ophthalmic lens of claims 1, 13, 25, 26, 27, 28 or 27, wherein the lens includes ultraviolet blocking additives.

* * * * *

UNITED STATES PATENT AND TRADEMARK OFFICE
CERTIFICATE OF CORRECTION

PATENT NO. : 5,517,260
DATED : May 14, 1996
INVENTOR(S) : George E. Glady et al.

It is certified that error appears in the above-indentified patent and that said Letters Patent is hereby corrected as shown below:

Claim 14, column 8, line 65, change "progress" to --progressive--.

Claim 28, column 10, line 35, change "25, 26, 27, 28" to --23, 24, 25, 26--.

Claim 29, column 10, line 37, change "25, 26, 27, 28" to --23, 24, 25, 26--.

Claim 30, column 10, line 39, change "25, 26, 27, 28" to --23, 24, 25, 26--.

Signed and Sealed this

Tenth Day of September, 1996

*Attest:*

BRUCE LEHMAN

*Attesting Officer*     *Commissioner of Patents and Trademarks*